United States Patent [19]

Nakamura et al.

[11] Patent Number: 4,722,206
[45] Date of Patent: Feb. 2, 1988

[54] LOCK SYSTEM FOR HINGED WINDOW-MOUNTED BACK DOOR

[75] Inventors: Hitoshi Nakamura, Yokohama; Masao Iwata, Isehara; Masamitsu Murakami, Sagamihara, all of Japan

[73] Assignees: Nissan Motor Co., Ltd.; Ohi Seisakusho Co., Ltd., both of Yokohama, Japan

[21] Appl. No.: 889,338

[22] Filed: Jul. 25, 1986

[30] Foreign Application Priority Data

Aug. 9, 1985 [JP] Japan .................. 60-174013

[51] Int. Cl.⁴ ............................... E05B 65/12
[52] U.S. Cl. .................................... 70/240
[58] Field of Search .............. 70/240, 241; 292/24, 292/44, 216, DIG. 43; 296/56, 76 R, 106, 146; 49/168, 169, 171

[56] References Cited

U.S. PATENT DOCUMENTS

| | | | |
|---|---|---|---|
| 2,880,033 | 3/1959 | Shelton | 296/76 |
| 3,612,601 | 10/1971 | Himka | 49/163 |
| 4,413,854 | 11/1983 | Hirshberg | 296/76 |

FOREIGN PATENT DOCUMENTS 572709 2/1958 Italy ........................ 296/76
57-191125 11/1982 Japan .

Primary Examiner—Robert L. Wolfe
Attorney, Agent, or Firm—Schwartz, Jeffery, Schwaab, Mack, Blumenthal & Evans

[57] ABSTRACT

A lock system for a hinged window-mounted back door is disclosed which comprises a first lock mounted to a main door part for releasably holding the main door part in its closed position, a second lock mounted to the main door part for releasably holding an auxiliary door part in its closed position, a control device mounted to the main door part for releasing the latched condition of the first lock when assuming a first position and releasing the latched condition of said second lock when assuming a second position, and a restraining structure associated with one of the first and second locks for preventing the control device from assuming a position to allow one of the first and second locks to assume its unlatched condition when the other lock assumes its unlatched condition.

20 Claims, 21 Drawing Figures

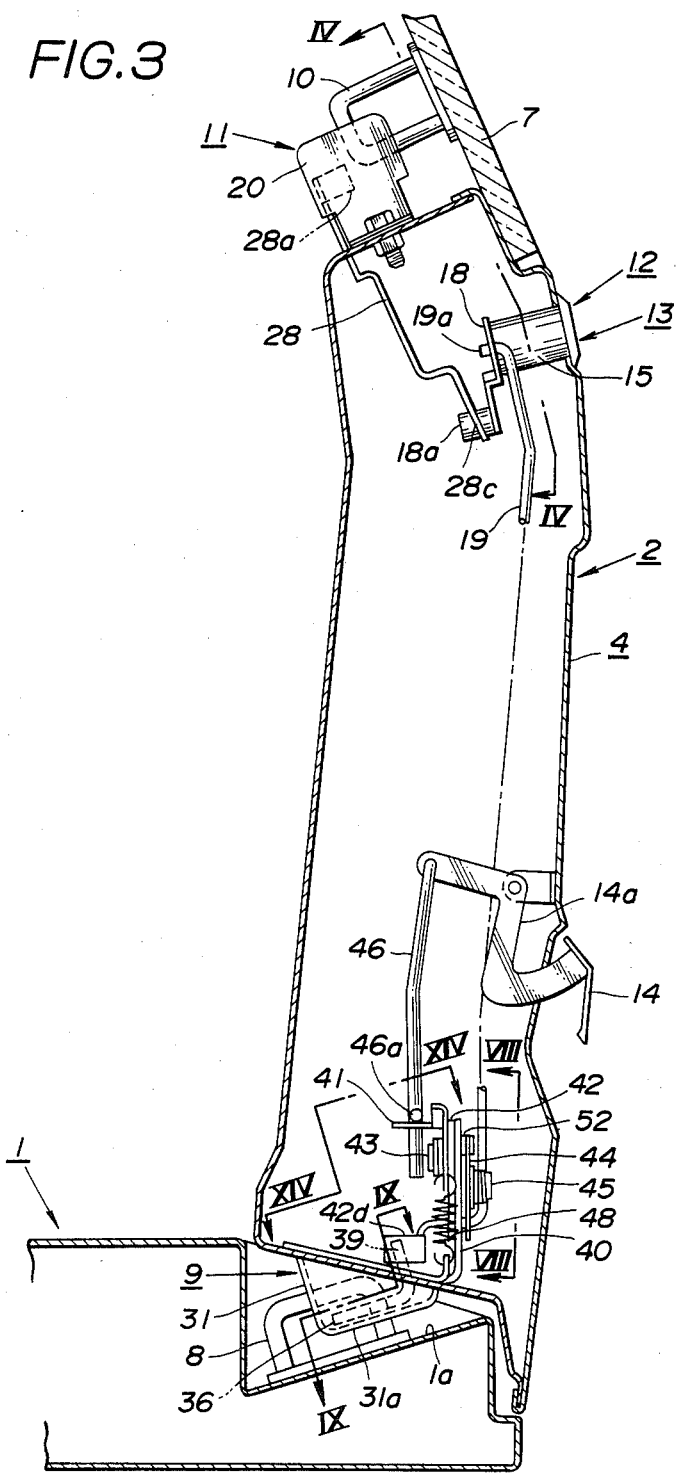

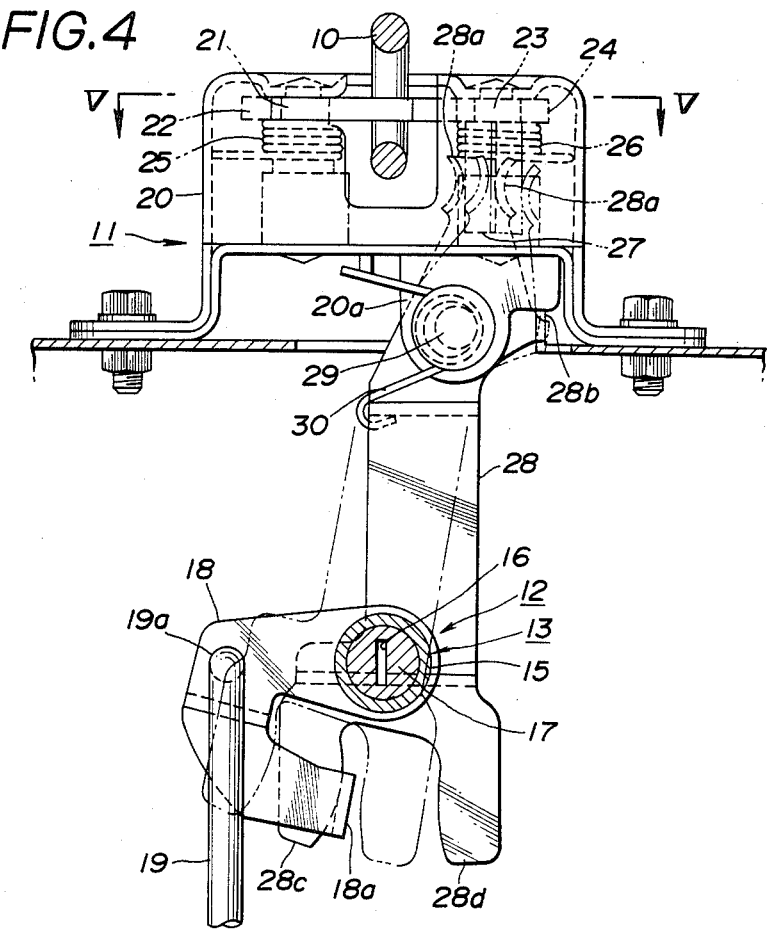

LOCK SYSTEM FOR HINGED WINDOW-MOUNTED BACK DOOR

BACKGROUND OF THE INVENTION

1. Field of the Invention

The present invention relates in general to a lock system for a back door of a motor vehicle, and more particularly to a lock system for a back door of a type having an auxiliary door pivotally mounted thereto. More specifically, the present invention is concerned with a lock system which can selectively operate a first lock device of a main door and a second lock device of an auxiliary door hinged to the main door.

2. Description of the Prior Art

In order to clarify the task of the present invention, a conventional lock system of the above-mentioned type will be outlined with reference to FIG. 21, which is disclosed in Japanese Patent First Provisional Publication No. 57-191125.

Referring to FIG. 21, a so-called "hinged window-mounted door" a is shown as a back door of a delivery van type motor vehicle. The back door a comprises a main door part c hinged at its upper end to a vehicle body b to open and close a back opening of the vehicle, and an auxiliary door part e hinged to the main door part c to open and close a window opening d formed in the same.

In order to releasably hold the main door part c and the auxiliary door part e in their closed positions, first and second lock devices f and g are independently mounted to the back door. Upon request of opening the main door part c, the first lock device f is manipulated to release the main door part c, while, upon request of opening the auxiliary door part e, the second lock device g is manipulated to release the auxiliary door part. That is, in the conventional door lock system, opening operations of the main and auxiliary door parts c and e are independently carried out by respective lock devices f and g.

However, due to this inherent construction, the above-mentioned conventional lock system may induce the following undesirable matters. That is, if, with a baggage h carried on the roof of the vehicle, the main door part c is brought into open position with the auxiliary door part e opened, it may occur that the auxiliary door part e collides against an edge of the baggage h resulting in brekage of the same. The problems of this type are frequently and unavoidably carried out by absentminded persons.

Of course, these problems may be solved when the maximum open angles of the main and auxiliary door parts c and e are restrained to small degrees. However, in this case, loading and unloading of goods through the back door opening of the vehicle become difficult and at least troublesome.

Furthermore, since the conventional lock system has two key cylinder devices for the respective lock devices, a person unfamiliar with the vehicle may be confused in finding a proper key cylinder for opening a desired door part.

SUMMARY OF THE INVENTION

It is therefore an essential object of the present invention to provide an improved lock system for a back door of the type having an auxiliary door hinged thereto, which is free of the above-mentioned drawbacks.

According to the present invention, there is provided a lock system for a hinged window-mounted back door, which has a single control device by which two lock devices are selectively operated.

According to the present invention, there is provided a lock system for a door structure which includes a main door part hinged to a fixed member and an auxiliary door part hinged to the main door part, the lock system comprising a first lock device mounted to the main door part and assuming both a latched condition wherein the main door part is latched and an unlatched condition wherein the main door part is unlatched, a second lock device mounted to the main door part and assuming both a latched condition wherein the auxiliary door part is latched and an unlatched condition wherein the auxiliary door part is unlatched, a control device mounted to the main door part and linked to both the first and second lock devices through respective link means, the control device releasing the latched condition of the first lock device when assuming a first condition and releasing the latched condition of the second lock device when assuming a second condition, and restraining means associated with at least one of the first and second lock devices, the means preventing the control device from assuming a position to allow one of the first and second lock devices to assume its unlatched condition when the other lock device assumes its unlatched condition.

BRIEF DESCRIPTION OF THE DRAWINGS

FIGS. 1 to 15 are drawings showing a first embodiment of the present invention; in which:

FIG. 1 is a back view of a delivery van type motor vehicle equipped with a lock system of the first embodiment of the invention;

FIG. 2 is a sectional view taken along the line II—II of FIG. 1;

FIG. 3 is an enlarged sectional view taken along the line III—III of FIG. 1;

FIG. 4 is an enlarged sectional view taken along the line IV—IV of FIG. 3, showing a control device and a second lock device which are operatively connected with each other;

FIG. 5 is a sectional view taken along the line V—V of FIG. 4;

FIG. 6 is a sectional view of the control device in a condition wherein a key rotor of the control device has been turned from a neutral position as illustrated by a phantom line to a second lock releasing position as illustrated by a solid line;

FIG. 7 is a view similar to FIG. 6, but showing a condition wherein the key rotor of the control device has been turned from the neutral position as illustrated by a phantom line to a first lock releasing position as illustrated by a solid line;

FIG. 8 is an enlarged back view taken from the direction of the arrow of VIII—VIII of FIG. 3, showing partially a first lock device;

FIG. 9 is an enlarged sectional view taken along the line IX—IX of FIG. 3, showing partially the first lock device in latched condition;

FIG. 10 is a view similar to FIG. 8, but showing a condition wherein an open lever of the first lock device has been turned to its latch releasing position;

FIG. 11 is a view similar to FIG. 9, but showing a condition wherein the first lock device is in its unlatched condition;

FIG. 12 is a view similar to FIG. 8, but showing a condition wherein a locking-unlocking lever of the first lock device has been turned to its unlatched position;

FIG. 13 is a view similar to FIG. 8, but showing a condition wherein the locking-unlocking lever has been turned to a second lock releasing position;

FIG. 14 is an enlarged view taken from the direction of the arrow XIV—XIV of FIG. 3;

FIG. 15 is a sectional view taken along the line XV—XV of FIG. 14;

FIGS. 17 to 20 are drawings showing a third embodiment of the present invention, in which:

FIG. 17 is a back view of essential parts of a control device of a lock system of the third embodiment;

FIG. 18 is a sectional view taken along the line XVIII—XVIII of FIG. 17;

FIG. 19 is a sectional view taken along the line XVIIII—XVIII of FIG. 18;

FIG. 20 is a sectional view taken along the line XX—XX of FIG. 18; and

DETAILED DESCRIPTION OF THE INVENTION

In the following, embodiments of the present invention will be described in detail with reference to the drawings. However, description on some parts and constructions which have not direct connection with the present invention will be omitted.

Referring to FIGS. 1 to 15, there is shown a lock system of a first embodiment of the present invention, which is practically applied to a so-called "hinged window-mounted back door" of a delivery van type motor vehicle.

Figure 1:
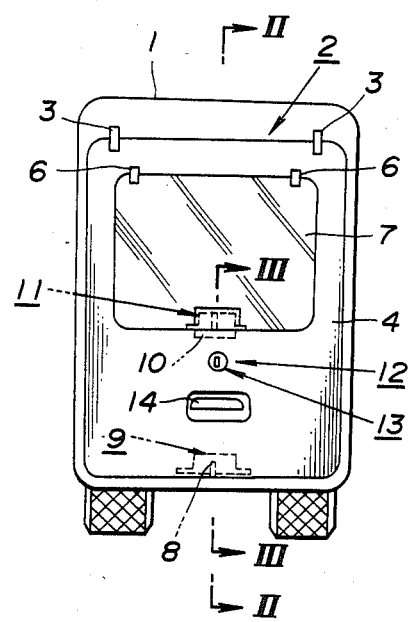
Figure 2:
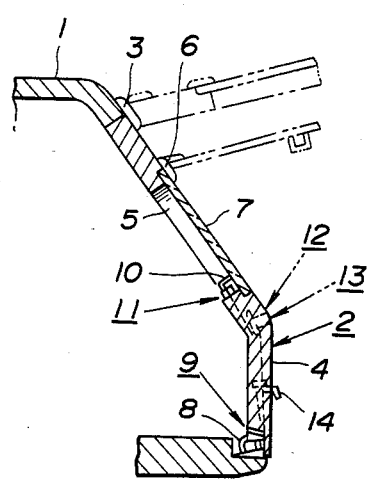

In FIGS. 1 and 2, denoted by numeral 1 is a body of the motor vehicle, which is equipped with the hinged window-mounted back door 2. The door 2 comprises generally a main door part 4 which is pivotally connected at its upper portion to a back-upper portion of the body 1 through two spaced hinges 3 and 3 so as to close and open a back door opening of the body 1, and an auxiliary door part (or window pane) 7 which is pivotally connected at its upper portion to the main door part 4 through two spaced hinges 6 and 6 so as to close and open a rectangular window opening 5 formed in the main door part 4.

Denoted by numeral 8 (see FIG. 3) is a generally U-shaped striker which is secured to a middle portion of a rear edge of the vehicle floor, and denoted by numeral 9 is a first lock device which is mounted to a middle portion of a lower edge of the main door part 4. Upon closing of the main door part 4, the first lock device 9 lockingly catches the striker 8 to latch the main door part 4 to the vehicle body 1.

Denoted by numeral 10 (see FIG. 3) is another generally U-shaped striker which is secured to a lower portion of the auxiliary door part 7, and denoted by numeral 11 is a second lock device which is mounted to a lower edge portion of the window opening 5. Upon closing of the auxiliary door part 7, the second lock device 11 lockingly catches the striker 10 to latch the auxiliary door part 7 to the main door part 4.

Denoted by numeral 12 (see FIG. 3) is a control device which, as will be described in detail hereinafter, is linked to both the first and second lock devices 9 and 11 so as to selectively release a latched condition of the first lock device 9 when assuming one position and release a latched condition of the second lock device 11 when assuming the other position. The control device 12 comprises a key cylinder device 13 mounted to the main door part 4, as is seen from FIG. 3.

Denoted by numeral 14 (see FIG. 3) is a handle pivotally mounted to the main door part 4 and linked to the first lock device 9 in an after-mentioned manner.

As will be described in detail hereinafter, in the disclosed first embodiment, upon unlocking of the second lock device 11 due to operation of the control device 12, the auxiliary door part 7 is instantly opened However, in case of the main door part 4, the opening operation of the same is carried out when the handle 14 is manipulated after achieving unlocking operation of the control device 12 to the first lock device 9.

In the following, detailed construction of each part will be described with reference to FIG. 3.

The key cylinder device 13 of the control device 12 is of a conventional type which thus comprises a key cylinder 15 secured to the main door part 4 and a key rotor 17 (see FIG. 4) rotatably received in the key cylinder 15. The key rotor 17 has a key hole 16 formed therein for receiving a key (not shown) as is understood from FIG. 4. As is seen from FIGS. 3 and 4, a generally U-shaped key plate 18 is secured to an inboard end of the key rotor 17 to rotate therewith. By manipulating a key (not shown) in the key rotor 17, the key plate 18 is rotated, together with the key rotor 17, from its neutral position as shown in FIG. 4 to either a second lock releasing position as shown in FIG. 6 or a first lock releasing position as shown in FIG. 7.

Figure 6:
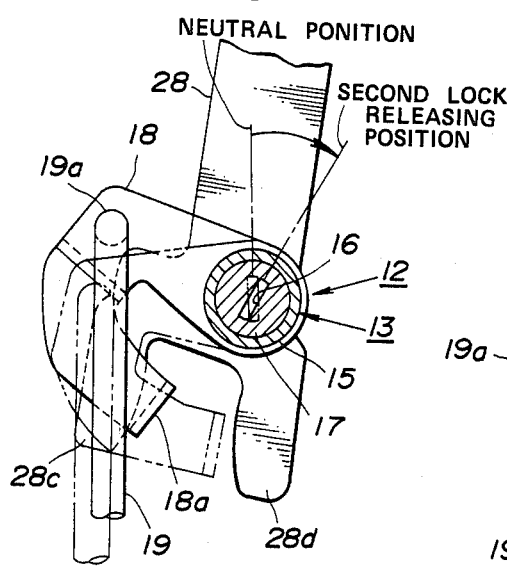
Figure 7:
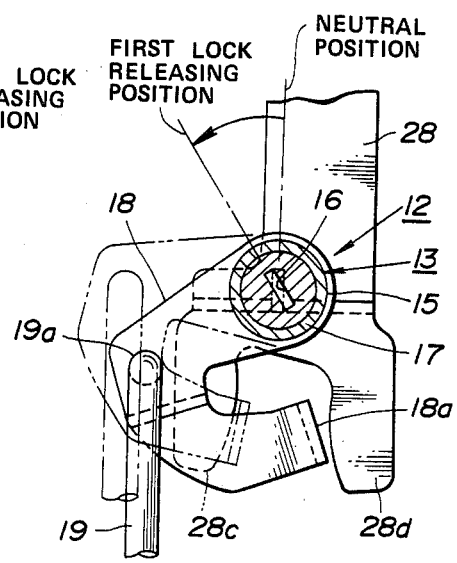

As may be understood from FIGS. 6 and 7, the key rotor 17 assumes respective angular positions thereof corresponding to those of the key plate 18 as is understood from the position of the key hole 16 illustrated by a solid line.

As is seen from FIG. 4, the key plate 18 has at its leading end a lug 18a bent toward the other side with respect to the surface of the drawing. The bottom portion of the U-shaped key plate 18 is formed with an opening (no numeral) with which a bent upper end 19a of a rod 19 is pivotally engaged. As will be described hereinafter, the rod 19 leads to the first lock device 9 to operate or release the same.

As is seen from FIGS. 3 to 5, the second lock device 11 comprises a case 20 secured to the main door part 4, a latch plate 22 pivotally disposed about a pivot shaft 21 secured to the case 20, and a pawl plate 24 pivotally disposed about another pivot shaft 23 which is parallel with the shaft 21 and secured to the case 20.

As is illustrated by a phantom line in FIG. 5, the latch plate 22 assumes its unlatched position when the second lock device 11 releases the striker 10 of the auxiliary door part 7, that is, when the auxiliary door part 7 is opened. While, when the striker 10 comes into engagement with the second lock device 11, the latch plate 22 is turned to its latched position as illustrated by a solid line to latch the striker 10. Under this latched condition, a recess 22a formed in the latch plate 22 tightly receives a portion of the striker 10.

As is illustrated by a phantom line in FIG. 5, the pawl plate 24 assumes its latch releasing position when the latch plate 22 assumes the unlatched position (as illustrated by a phantom line), that is, when the auxiliary door part 7 is opened. Under this latch releasing condition of the pawl plate 24, an engaging portion 24a formed on the pawl plate 24 rides on an arcuate edge 22b of the latch plate 22. The arcuate edge 22b is concentric with the pivot shaft 21. When the latch plate 22 assumes the latched position (as illustrated by a solid line), that is, when the striker 10 of the auxiliary door part 7 is caught by the second lock device 11, the engaging portion 24a of the pawl plate 24 is lockingly engaged with an angled portion 22c of the latch plate 22 which is defined between the arcuate edge 22b and the recess 22a. Thus, under this latched condition, rotation of the latch plate 22 toward its unlatched position is blocked by the pawl plate 24.

As is seen from FIGS. 5 and 6, a coil spring 25 is disposed about the pivot shaft 21 with one end (no numeral) hooked to the latch plate 22 (see FIG. 5) and the other end (no numeral) hooked to the case 20 (see FIG. 6), so that the latch plate 22 is biased in a clockwise direction in FIG. 5, that is, toward its unlatched position. Another coil spring 26 is disposed about the pivot shaft 23 of the pawl plate 24 (see FIG. 4) with one end hooked to a pin 27 of the pawl plate 24 and the other end hooked to the case 20 (see FIG. 6), so that the pawl plate 24 is biased in a counter clockwise direction in FIG. 5, that is, toward the latch position of the pawl plate 24. As is understood from FIG. 4, the pin 27 extends from the pawl plate 24 downward in this drawing.

As is seen from FIG. 4, a bracket 20a extends downward from the bottom portion of the case 20, which has a pivot pin 29 secured thereto. A pivoted lever 28 is supported by the pivot pin 29 so as to be pivotal about the axis of the same. The upper portion of the pivotal lever 28 is projected into the case 20 passing through an opening (no numeral) formed in the bottom of the case 20. The upper portion of the pivotal lever 28 is formed with a pair lugs 28a by which the pin 27 is put, so that a pivotal movement of the lever 28 about the pivot pin 29 induces a pivotal movement of the pawl plate 24 about the pivot pin 23.

That is, when the pawl plate 24 assumes its latch position (as illustrated by a solid line in FIG. 5), the pivotal lever 28 assumes its latch position as illustrated by a solid line in FIG. 4, and when the pawl plate 24 assumes its latch releasing position (as illustrated by a phantom line in FIG. 5), the pivotal lever 28 assumes its latch releasing position as illustrated by a phantom line in FIG. 4.

As may be seen from FIG. 4, the paired lugs 28a have mutually facing convex portions. With this construction, the movement transmission from the lever 28 to the pawl plate 24 is smoothly made. The pivotal lever 28 is formed near the pivot pin 29 with a stopper lug 28b which is brought into abutment with a lug 20b of the bracket 20a when the lever 28 is pivoted to its latch position as illustrated by the solid line in FIG. 4. With this, extreme counterclockwise rotation of the lever 28 is suppressed. A coil spring 30 is disposed about the pivot pin 29 with one end hooked to the bottom of the case 20 and the other end hooked to the lever 28, so that the pivotal lever 28 is biased in a counterclockwise direction in FIG. 4.

The pivotal lever 28 is formed with a forked lower end including two spaced leg portions 28c and 28d which put therebetween the lug 18a of the aforementioned generally U-shaped key plate 18, as may be well understood from FIG. 3.

The positional relationship between the forked lower end of the pivotal lever 28 and the lug 18a of the key plate 18 is made in the following manner.

That is, when, as is understood from FIG. 4, the lever 28 assumes its latch position as illustrated by the solid line, one leg portion 28c thereof contacts or at least comes near the lug 18a of the key plate 18 which is in its neutral position. Thus, when, under this condition, the key plate 18 is turned to the second lock relasing position (the position illustrated by a solid line in FIG. 6) due to corresponding rotation of the key rotor 17, the lug 18a of the key plate 18 pushes the leg portion 28c of the lever 28 in a clockwise direction in FIG. 4 to the latch releasing position of the lever 28, as is illustrated by a phantom line in FIG. 4. As will be understood hereinafter, once the pivotal lever 28 comes to its latch releasing position (as illustrated by a phantom line in FIG. 4) and external force applied to the leg portion 28c is removed, the lever 28 is returned back but slightly due to the force of the coil spring 30 and stopped at its halfway position where the other leg portion 28d of the lever 28 is close to the lug 18a of the key plate 18 which is in its neutral position. Under this condition, the pivotal lever 28 is blocked from pivoting in a counterclockwise direction in FIG. 4, that is, toward its latch position illustrated by the solid line, so that rotation of the key plate 18 toward its first lock releasing position is blocked due to the interruption of the other leg portion 28d.

However, when the lever 28 is in its latch position as illustrated by a solid line in FIG. 4, the key plate 18 can swing between its neutral position and the first lock releasing position because the lug 18a of the key plate 18 can freely move between the two leg portions 28c and 28d.

Accordingly, when a key (not shown) is inserted into the key hole 16 of the key rotor 7 and turned in a direction to turn the key plate 18 from its neutral position to the second lock releasing position (as illustrated by the solid line in FIG. 6), the lever 28 and the pawl plate 24 are turned to their latch releasing positions thus releasing the latch plate 22. With this, the striker 10 of the auxiliary door part 7 is released from the second lock device 11, so that the auxiliary door part 7 can be opened. Upon this, the engaging portion 24a of the pawl plate 24 comes into engagement with the arcuate edge 22b of the latch plate 22, so that the pawl plate 24 and the pivotal lever 28 are kept in their latch releasing positions. Thus, thereafter, the key plate 18 of the key cylinder 13 is blocked from turning from its neutral position to its first lock releasing position.

Accordingly, when the auxiliary door part 7 is kept opened, releasement of the first lock device 9 by manipulating the control device 12 is impossible. This is quite advantageous when considering dangerousness which would arise when the main door part 4 is opened with the auxiliary door part 7 opened.

When the auxiliary door part 7 is closed, the striker 10 of the part 7 is brought into engagement with the latch plate 22 and pushes the same. With this, the latch plate 22 is turned to its latched position permitting the engaging portion 24a of the pawl plate to come into locking engagement with the angled portion 22c of the same. With this, the pawl plate 24 and the lever 28 are both turned to their latch positions by the forces of the springs 26 and 30. Thereafter, the key plate 18 of the control device 12 can be turned in the other direction to release the first lock device 9 to open the main door part 4 in such a manner as will be described in the following.

As will be understood from the foregoing description, in the first embodiment, the pivotal lever 28 serves both as a link means for linking the control device 12 to the second lock device 11 and a restraining means for, when the second lock device 11 is in its unlatched condition, blocking the operation of the control device 12 to release the first lock device 9.

In the following, the first lock device 9 also incorporated with the afore-mentioned control device 12 will be described in detail with reference to FIGS. 8 to 15.

The first lock device 9 comprises a case 31 secured to a lower edge portion of the main door part 4 in a manner to project outwardly (see FIG. 3). As is seen from FIG. 3, the case 31 has a bottom portion 31a inclined with respect to the lower edge portion, and the case 31 further has a slot 32 into which the afore-mentioned striker 8 is insertable to accomplish latching of the main door part 4 relative to the body 1 of the motor vehicle. As is seen from FIG. 9, a latch plate 34 and a pawl plate 36 are housed in the case 31 and operate in substantially the same manner as that in the second lock device 11. These latch plate 34 and pawl plate 36 are pivotally disposed about respective pivot pins 33 and 35 which are secured to the bottom portion 31a of the case 31.

As is seen from FIG. 3, the striker 8 is secured to an inclined surface 1a of the rear edge of the vehicle floor. The inclined surface 1a and the inclined bottom surface 31a of the case 31 are so arranged that upon closing of the main door part 4, they become parallel with each other.

Figure 9:
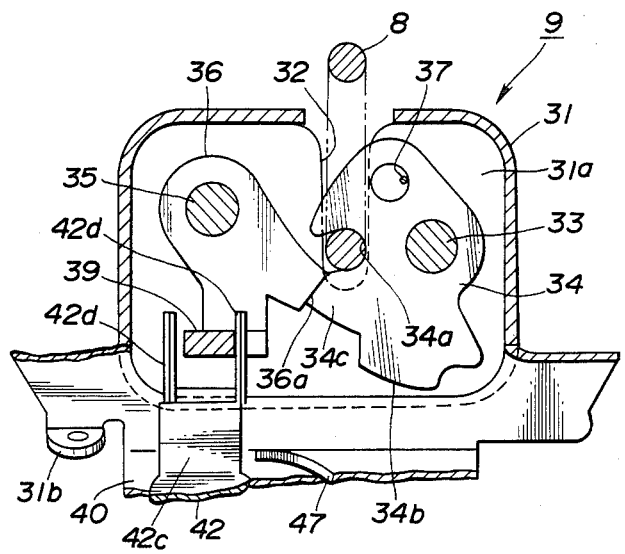
Figure 11:
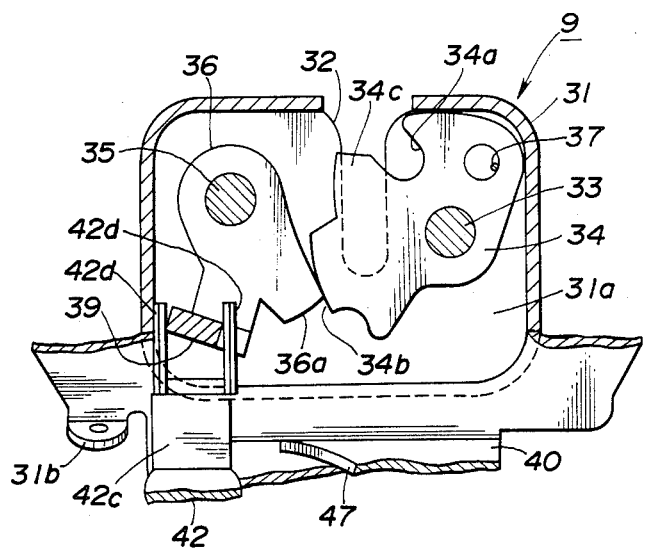

As is seen from FIG. 11, the latch plate 34 assumes its unlatched position when the first lock device 9 releases the striker 8 of the vehicle body, that is, when the main door part 4 is opened. While, when the striker 8 comes into engagement with the first lock device 9, that is, when the main door part 4 is closed, the latch plate 34 is turned to its latched position to latch the striker 8 as is shown in FIG. 9. Under this latched condition, a recess 34a formed in the latch plate 34 receives the striker 8.

When the latch plate 34 is in its unlatched position (as shown in FIG. 11), that is, when the main door part 4 is opened, the pawl plate 36 assumes its latch releasing position with an engaging portion 36a thereof being in contact with an arcuate edge 34b of the latch plate 34. The arcuate edge 34b is concentric with the pivot pin 33. When, as is seen from FIG. 9, the main door part 4 is closed and thus the latch plate 34 is turned to its latched position by the striker 8, the engaging portion 36a of the pawl plate 36 comes into locking engagement with an angled portion 34c of the same which is defined between the arcuate edge 34b and the recess 34a. Thus, under this condition, rotation of the latch plate 33 toward its unlatched position is blocked by the pawl plate 36.

Figure 14:
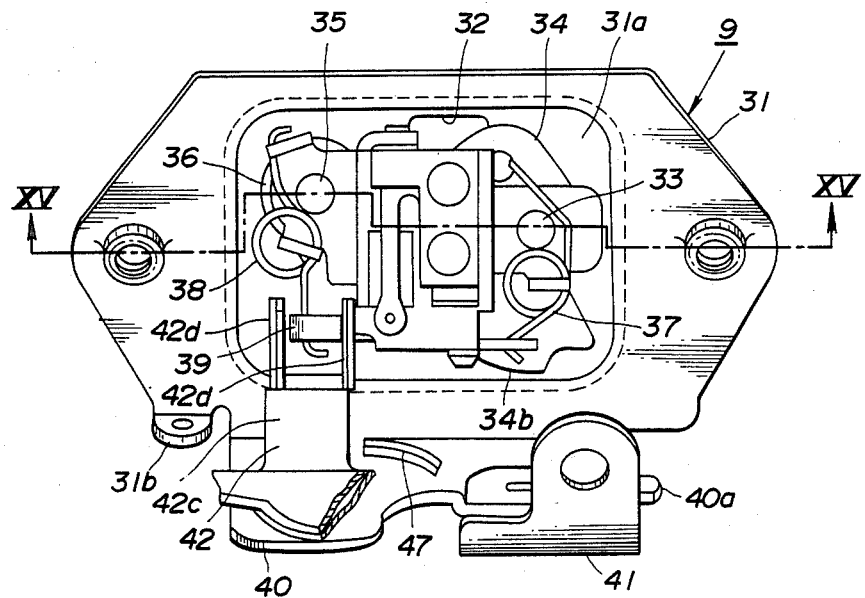
Figure 15:
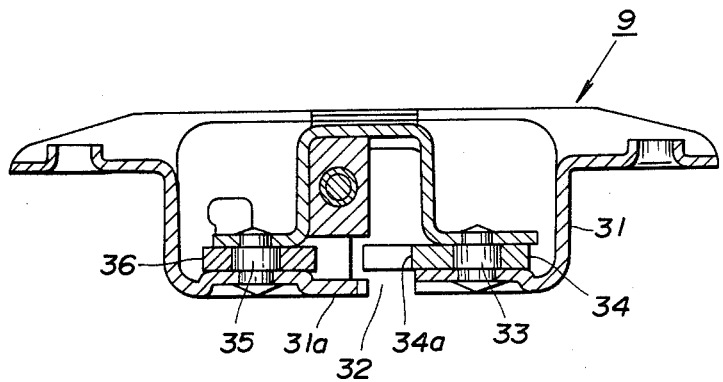

As is seen from FIG. 14, a coil spring 17 is arranged in the case 31 in a manner to bias the latch plate 34 toward its unlatched position, that is, in a clockwise direction in FIGS. 9 and 11. Another coil spring 38 (see FIG. 14) is arranged in the case 31 in a manner to bias the pawl plate 36 toward its latch position, that is, in a counterclockwise direction in FIGS. 9 and 11. The pawl plate 36 is formed with a pin 39 which extends toward this side in FIG. 14.

The case 31 is formed with an outwardly extending back plate 40. As is seen from FIG. 8, a pivot shaft 43 is fixed to the back plate 40 to pivotally support a handle lever 41 and an open lever 42. It is to be noted that the open lever 42 and the handle lever 41 are arranged in this order at an inboard side (via., the side facing toward the case proper 31) of the back plate 40. A locking-unlocking lever 44 is pivotally connected to the outboard side of the back plate 40 through a pivot pin 45.

Figure 8:
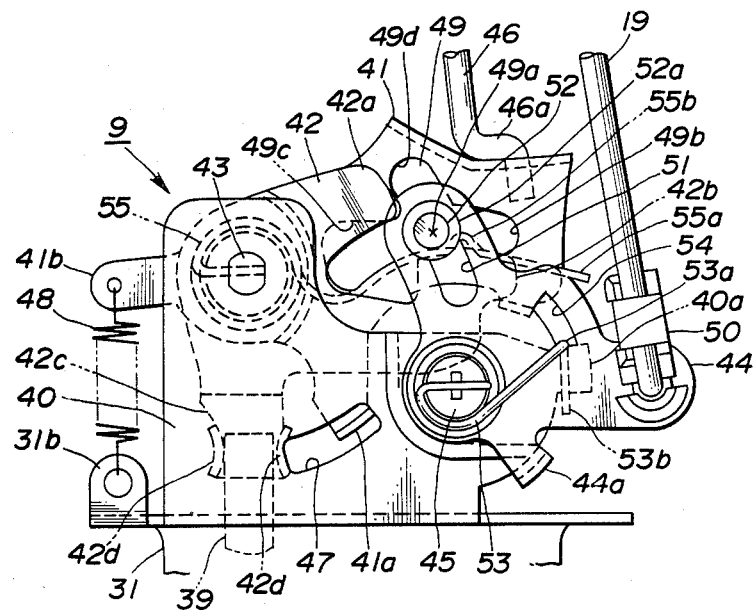

As is seen from FIG. 8, an upper portion of the handle lever 41 is bent at normal to which a crank end portion 46a of a rod 46 is pivotally connected. As is seen from FIG. 3, the rod 46 extends upwardly to a pivotal arm member 14a of the handle 14, so that when the handle 14 is manipulated to pivot the arm member 14a in a counterclockwise direction in FIG. 3, the rod 46 is moved downward thereby to pivot the handle lever 41 about the pivot shaft 42 in a clockwise direction in FIG. 8 from its inoperative position as shown in the drawing. A coil spring 48 is arranged between an arm 41b of the handle lever 41 and a lug 31b of the case 31 thereby to bias the handle lever 41 toward its inoperative position, that is, in a counterclockwise direction in FIG. 8 about the pivot shaft 43.

The back plate 40 is formed with an arcuate slot 47 which is concentric with the pivot shaft 43 and into which a bent end 41a of another arm (no numeral) of the handle lever 41 is spacedly received. As the bent end 41a is selectively engageable with longitudinal ends of the arcuate slot 47, the angle of rotation of the handle lever 41 is limited.

The handle lever 41 is formed with a generally T-shaped slot 49. The slot 49 consists of a first arcuate section 49b, a sectoral section 49c and a second arcuate section 49d which are merged to form the generally T-shaped slot 49. It is to be noted that the x-mark indicated by numeral 49a in FIG. 8 is an intermediate or neutral position of the T-shaped slot 49 at which an after-mentioned pin 52 lies when the same assumes its neutral position. As will be understood from FIG. 8, the lower sides of the first arcuate section 49b and the sectoral section 49c form a common arcuate line which is, when the parts assume the illustrated positions, concentric with the pivot pin 45. The second arcuate section 49d is formed to be concentric with the pivot shaft 43.

The open lever 42 placed beneath the handle lever 41 comprises first, second and third arm 42a 42b and 42c which are spaced from one another. Under the condition as illustrated in FIG. 8, the first arm 42a extends in the upper-right direction, the second arm 42b extends in the rightward direction and the third arm 42c extends downward.

The lower end portion of the third lever 42c is cranked and formed with a pair of spaced lugs 42d between which the afore-mentioned pin 39 of the pawl plate 36 is put. Due to this connection between the pin 39 and the lugs 42d, the open lever 42 moves together with the pawl plate 36, like in the case of the connection between the pivotal lever 28 and the pawl plate 24 of the afore-described second lock device 11.

That is, the open lever 42 assumes its latch position as shown in FIG. 8 when the pawl plate 36 assumes its latch position as shown in FIG. 9. While, when the pawl plate 36 is turned to its latch releasing position as shown in FIG. 11, the open lever 42 is brought into its latch releasing position.

When the open lever 42 assumes its latch position (as shown in FIG. 8), a leading end (or stopper end) of the first arm 42a disappears from the T-shaped slot 49 and a leading end of the second arm 42b becomes flush with the lower side of the first arcuate section 49b of the slot 49. When, then, the open lever 42 is turned to its latch releasing position (as shown in FIG. 10), the leading end of the first arm 42a becomes exposed to the sectoral section 49c thereby to block an after-mentioned pin 52 from moving in the slot 49 toward the sectoral section 49c, and the leading end of the second arm 42b is moved away from the lower side of the first arcuate section 49b of the slot 49.

As is seen from FIG. 8, to the right end of the locking-unlocking lever 44, there is connected through a known rod holder 50 a lower end of the rod 19 which leads to the afore-mentioned key plate 18 of the control device 12. With this rod 19, the locking-unlocking lever 44 and the key plate 18 move together.

Figure 10:
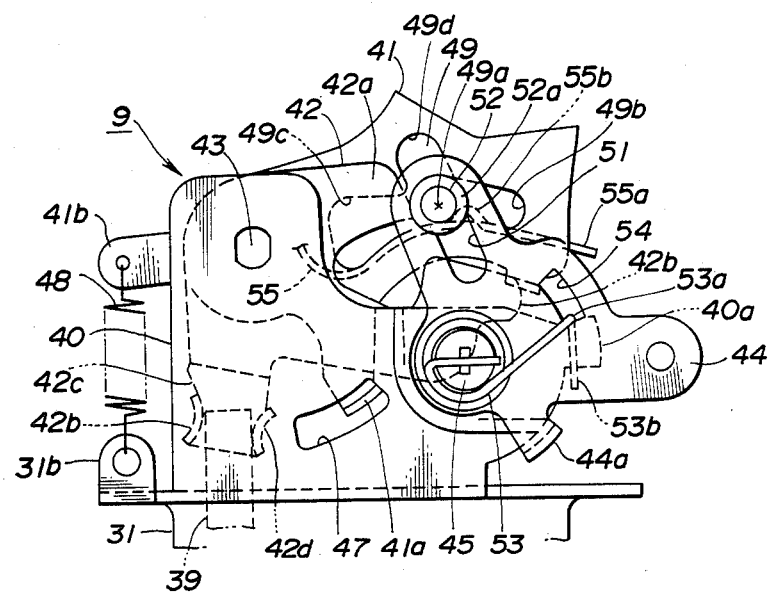
Figure 12:
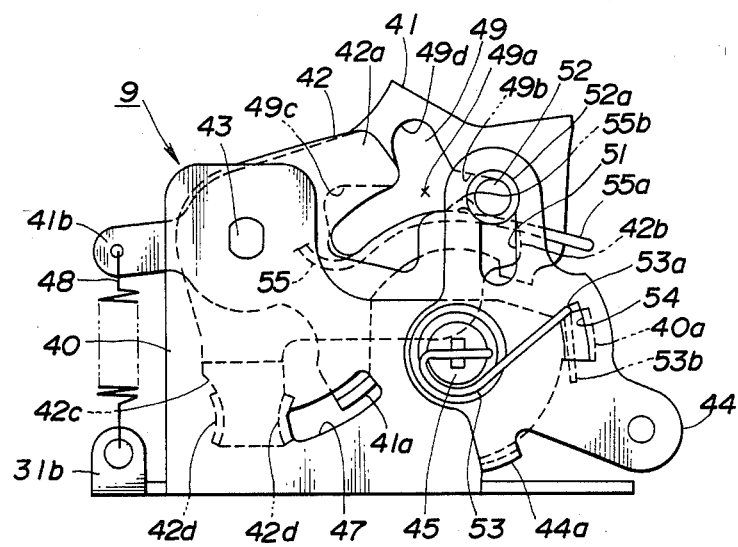
Figure 13:
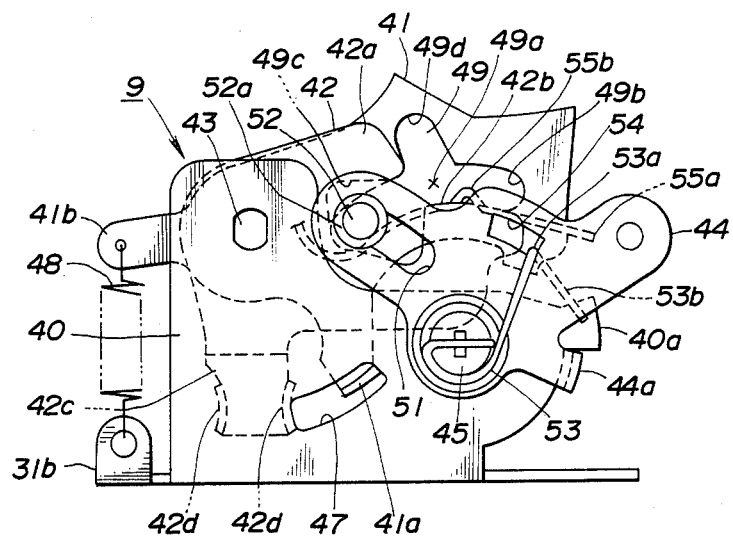

That is, the locking-unlocking lever 44 assumes its lock position as shown in FIGS. 8 and 10 when the key plate 18 assumes its neutral position. When the key plate 18 is turned to the first lock releasing position (as illustrated by a solid line in FIG. 7), the locking-unlocking lever 44 is turned to its unlock position as shown in FIG. 12. While, when the key plate 18 is turned to its second lock releasing position (as illustrated by a solid line in FIG. 6), the locking-unlocking lever 44 is turned to its second lock releasing position as shown in FIG. 13.

The locking-unlocking lever 44 is formed, at a portion above the pivot pin 45, with an arcuate slot 51. The arcuate slot 51 is so formed that when the locking-unlocking lever 44 assumes its unlock position as shown in FIG. 12, it is concentric with the pivot shaft 43.

The slide pin 52 is slidably received at its one end in the arcuate slot 51 having the other end slidably received in the generally T-shaped slot 49. In order to slidably support the slide pin 52 on the locking-unlocking lever 44 keeping the same perpendicular to the surface of the lever 44, a pair of collars 52a are secured to the pin 52 slidably putting therebetween the peripheral edge of the arcuate slot 51.

As has been just mentioned, the other end of the slide pin 52 is slidably received in the T-shaped slot 49 of the handle lever 41. Arrangement is so made that when the locking-unlocking lever 44 is in its lock position (as shown in FIGS. 8 and 10), the slide pin 52 is placed at the intermediate position 49a of the slot 49, while, when the locking-unlocking lever 44 assumes the unlock position (as shown in FIG. 12), the slide pin 52 is received in the first arcuate section 49b, and when the lever 44 assumes the second lock releasing position (as shown in FIG. 13), the slide pin 52 is received in the sectoral section 49c.

The locking-unlocking lever 44 is formed with a lug 44a the leading end of which is bent to serve as a stopper. When the locking-unlocking lever 44 comes to its unlock position as shown in FIG. 12, the stopper lug 44a comes to contact with an edge (no numeral) of the back plate 40, and when the lever 44 comes to the second lock releasing position as shown in FIG. 13, the stopper lug 44a comes to contact with a projection 40a of the back plate 40. With this, the angle of rotation of the locking-unlocking lever 44 is limited.

A coil spring 53 is disposed about an outwardly projected portion of the pivot pin 45, which functions to bias the locking-unlocking lever 44 toward its lock position when the same is in the second lock releasing position. For achieving this function, an end portion of the spring 53 is fixed to the pivot shaft 45 and the other end portion of the same is bent to pass through an arcuate slot 54 formed in the locking-unlocking lever 44 and put on the projection 40a of the back plate 40. The other end portion is bent again at the projection 40a to extend along the inside surface of the back plate 40 and terminates at 53b. As may be seen from FIG. 8, the arcuate slot 54 is concentric with the pivot pin 45.

A coil spring 55 is arranged to bias the slide pin 52 upwardly in FIG. 8, that is, in a direction away from the pivot shaft 45. The spring 55 has a multi turned section disposed about the pivot shaft 43 and a hair-pin like section 55a abutting against the slide pin 52. The hair-pin like section 55a is formed with a raised portion 55b at its generally middle portion. With the provision of the raised portion 55b, a so-called "detent feeling" is produced when the slide pin 52 rides over the same. That is, the detent feeling is given when the slide pin 52 is moved in the slot 49 from the intermediate position 49a to the first arcuate section 49b and vice versa.

When the key plate 18 is in its neutral position (as shown in FIG. 4), the locking-unlocking lever 44 assumes its lock position (as shown in FIGS. 8 and 10) wherein the slide pin 52 is in the intermediate position 49a of the slot 49. Under this condition, the handle lever 41 can pivot downward in FIG. 8 permitting the slide pin 52 to enter the second arcuate section 49d of the slot 49. This pivot movement of the handle lever 41 does not induce any effective movement of other parts. Thus, even when the handle 14 (see FIG. 13) is pulled to rotate the handle lever 41 clockwise in FIG. 8, the latched condition of the first lock device 9 can not be released.

When now, due to key operation, the key plate 18 is turned to the first lock releasing position (as shown in FIG. 7) thereby to rotate the locking-unlocking lever 44 to its unlock position (as shown in FIG. 12) and thereafter the handle 14 is pulled, the clockwise movement of the handle lever 41 thus produced pushes the slide pin 52 downward in the arcuate slot 51 in FIG. 12 and thus pushes downwardly the leading end of the second arm 42b of the open lever 42 via the slide pin 52. With this, the open lever 42 is turned clockwise causing third arm 42c thereof to turn, through the pin 39, the pawl plate 39 (see FIG. 11) to the latch releasing position. Thus, the latch plate 34 is turned to its unlatched position cancelling the latched condition of the first lock device 9. Thus, the main door part 4 can be opened.

When the latched condition of the first lock device 9 is cancelled in a manner as is described hereinabove, the engaging portion 36a of the pawl plate 36 is brought into engagement with the arcuate edge 34b of the latch plate 34 causing the pawl plate 36 and the open lever 42 to assume their latch releasing positions. Upon this, the leading end of the first arm 42a of the open lever 42 is exposed to the sectoral section 49c of the slot 49. Thus, thereafter, the slide pin 52 moved with the locking-unlocking lever 44 is prevented from entering the sectoral section 49c of the slot 49. That is, once the first lock device 9 releases the main door part 4 in a manner as is described hereinabove, the locking-unlocking lever 44 and the key plate 18 linked to the lever 44 are prevented from turning to their second lock releasing positions.

Thus, when the main door part 4 is kept open, it is impossible to open the auxiliary door part 7 by manipulating the key cylinder 13 of the control device 12. This is very advantageous when considering the dangerousness which would arise when the auxiliary door part 7 is suddenly opened when the main door part 4 is kept opened.

When, now, the main door part 4 is closed, the latch plate 34 is turned to its latched position and the pawl plate 36 and the open lever 42 are turned to their latch positions due to attack of the striker 8. Upon this, the leading or stopper end of the first arm 42a of the open lever 42 disappears from the slot 49. Thus, thereafter, the slide pin 52 moved with the locking-unlocking lever 44 can move into the sectoral section 49c of the slot 49. Thus, under this condition, the key plate 18 of the key cylinder 13 can be turned to its second lock releasing position releasing the second lock device 11. Thus, the auxiliary door part 7 can be opened.

As will be understood from the foregoing description, the rod 19 and the locking-unlocking lever 44 constitute a link means for linking the control device 12 to the first lock device 9. Furthermore, the leading or stopper end of the first arm 42a of the open lever 42 constitutes a restraining means for restraining operation of the control device 12 in a direction to release the second lock device 11 under a condition wherein the first lock device 9 is in its unlatched condition.

Figure 16:
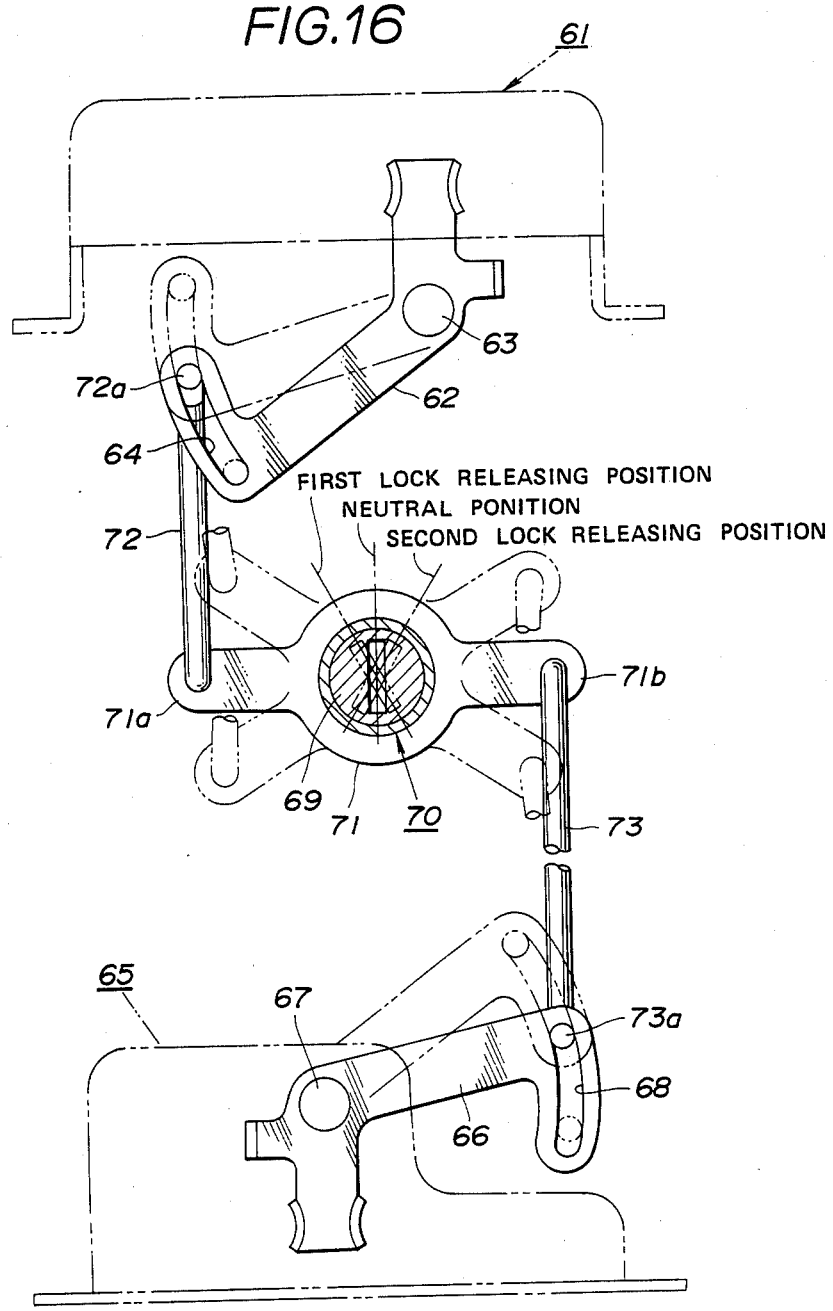
FIG. 16 is a back view of essential parts of a control device of a lock system of a second embodiment of the present invention.

Referring to FIG. 16, there is shown a second embodiment of a lock system of the present invention.

In the drawing, denoted by numeral 61 is a second lock device which is substantially the same as the afore-described second lock device of the first embodiment, and denoted by numeral 62 is a pivotal lever which is substantially the same as the pivotal lever 28 of the first embodiment. That is, the device 61 functions to latch the auxiliary door part 7 to the main door part 4.

When the second lock device 61 is in its latched condition, the pivotal lever 62 assumes its latch position as illustrated by a solid line in FIG. 16. When the pivotal lever 62 is turned to a latch releasing position as illustrated by a phantom line in FIG. 16, the second lock device 61 is turned to its unlatched condition. Upon this, the pivotal lever 62 is restricted to the latch releasing position. When thereafter the second lock device 61 is turned to its latched condition, the pivotal lever 62 is returned to its latch position.

The leading end portion of the pivotal lever 62 is formed with an arcuate slot 64 which is concentric with a pivot shaft 63 of the pivotal lever 62.

Designated by numeral 65 is a first lock device which is substantially the same as the above-mentioned second lock device 61, and which thus functions to latch the main door part 4 to the vehicle body proper. The first lock device 65 has a pivotal lever 66.

When the first lock device 65 is in its latched condition, the pivotal lever 66 assumes its latch position as illustrated by a solid line in FIG. 16. When the pivotal lever 66 is pivoted to a latch releasing position as illustrated by a phantom line in the drawing, the first lock device 65 is turned to its unlatched condition. Upon this, the pivotal lever 66 is restricted to the latch releasing position When thereafter the first lock device 65 is turned to its latched condition, the pivotal lever 65 is returned to its latched position.

The leading end portion of the pivotal lever 66 is formed with an arcuate slot 68 which is concentric with a pivotal shaft 67 of the pivotal lever 66.

A control device 70 is arranged on the main door part (not shown) at a position between the first and second lock devices 65 and 61. The control device 70 comprises a key rotor 69 which is rotatable, by a key (not shown), from its neutral position as illustrated by a solid line in FIG. 16 to both first and second lock releasing positions as illustrated by phantom lines in the drawing.

A key plate 71 is secured to the key rotor 69 to rotate therewith, which has first and second arms 71a and 71b which extend in opposed directions from the rotor 69.

To the first arm 71a, there is pivotally connected a rod 72 which has an upper bent end 72a slidably engaged with the arcuate slot 64 of the pivotal lever 62 of the second lock device 61.

The arrangement is made as follows. That is, when the pivotal lever 62 of the second lock device 61 is in its latch position (as illustrated by a solid line in FIG. 16), rotation of the key rotor 69 between the neutral position and the first lock releasing position induces a free movement of the upper bent end 72a of the rod 72 in the arcuate slot having no effect on the lever 62. However, when, with the pivotal lever 62 assuming the latch position, the rotor 69 is turned from the neutral position to the second lock releasing position, the upper bent end 72a of the rod 72 abuts on an upper end of the arcuate slot 64 and moves the pivotal lever 62 to its latch releasing position (as illustrated by a phantom line in FIG. 16). When the pivotal lever 62 is restrained to its latch releasing position (as illustrated by a phantom line in FIG. 16), rotation of the key rotor 69 from the second lock releasing position to the neutral position induces a free movement of the upper bent end 72a in the arcuate slot 64 from the upper end of the slot 64 to the lower end of the same. However, further turnings of the rotor 69 in the same direction, that is, toward the first lock releasing position, is blocked due to the restrained condition of the pivotal lever 62.

To the second arm 71b of the key plate 71, there is pivotally connected another rod 72 which has a lower bent end 73a slidably engaged with the arcuate slot 68 of the pivotal lever 66 of the first lock device 65.

The arrangement is made as follows. That is, when the pivotal lever 66 is in its latch position (as illustrated by a solid line in FIG. 16), rotation of the key rotor 69 between its neutral position and its second lock releasing position induces a free movement of the lower bent end 73a of the rod 73 in the arcuate slot 68 having no effect on the lever 66. However, when, with the pivotal lever 66 assuming the latch position, the key rotor 69 is turned from the neutral position to the first lock releasing position, the lower bent end 73a of the rod 73 abuts on the upper end of the arcuate slot 68 and moves the pivotal lever 66 to the latch releasing position (as illustrated by a phantom line in FIG. 16). When the pivotal lever 62 is restrained to its latch releasing position, rotation of the key rotor 69 from the first lock releasing position to the neutral position induces a free movement of the lower bent end 73a in the arcuate slot 68 from the upper end of the slot 68 to the lower end of the same. However, due the restrained condition of the pivotal lever 62, further turning of the rotor 69 in the same direction, that is, toward the second lock releasing position is blocked.

Operation of the second embodiment is as follows, which is similar to that of the afore-described first embodiment.

That is, when, with the main and auxiliary door parts being both closed and latched, the key rotor 69 is turned by a key (not shown) to the first lock releasing position, the rod 73 is lifted pivoting the pivotal lever 66 to its latch releasing position (as illustrated by a phantom line in FIG. 16) thereby to release the latched condition of the first lock device 65. Thus, the main door part can be opened.

During this, the rod 72 is also moved down. However, as has been described hereinabove, such movement of the rod 72 has no effect on the pivotal lever 62 of the second lock device 61.

When the main door part is opened, the pivotal lever 66 is restrained to the latch releasing position (as illustrated by a phantom line in FIG. 16). Under this condition, rotation of the key rotor 69 from the neutral position to the second lock releasing position is blocked.

Thus, when the main door part is kept open, it is impossible to open the auxiliary door part by manipulating the key rotor 69 of the control device 70.

When, with the main and auxiliary door parts being both closed, the key rotor 69 is turned by a key to the second lock releasing position, the rod 72 is lifted pivoting the pivotal lever 62 to its latch releasing position (as illustrated by a phantom line in FIG. 16) thereby releasing the latched condition of the second lock device 61. Thus, the auxiliary door part can be opened.

During this, the rod 73 is also moved down. However, as has been described hereinabove, such movement of the rod 73 has no effect on the pivotal lever 66 of the first lock device 65.

When the auxiliary door part is opened, the pivotal lever 62 is restrained to the latch releasing position (as illustrated by a phantom line in FIG. 16). Under this condition, rotation of the key rotor 69 from the neutral position to the first lock releasing position is blocked.

Accordingly, when the auxiliary door part is kept open, it is impossible to open the main door part As will be understood from the above description, in the second embodiment, the second arm 71b of the key plate 71, the rod 73 and the pivotal lever 66 constitute a link means for linking the control device 70 to the first lock device 65, and the first arm 71a of the key plate 71, the rod 72 and the pivotal lever 62 constitute a link means for linking the control device 70 to the second lock device 61.

Furthermore, the lower bent end 73a of the rod 73 and the arcuate slot 68 of the pivotal lever 66 constitute a first restraining means, while, the upper bent end 72a of the rod 72 and the arcuate slot 64 of the pivotal lever 62 constitute a second restraining means.

Referring to FIGS. 17 to 20, there is shown a third embodiment of a lock system of the present invention.

Figure 17:
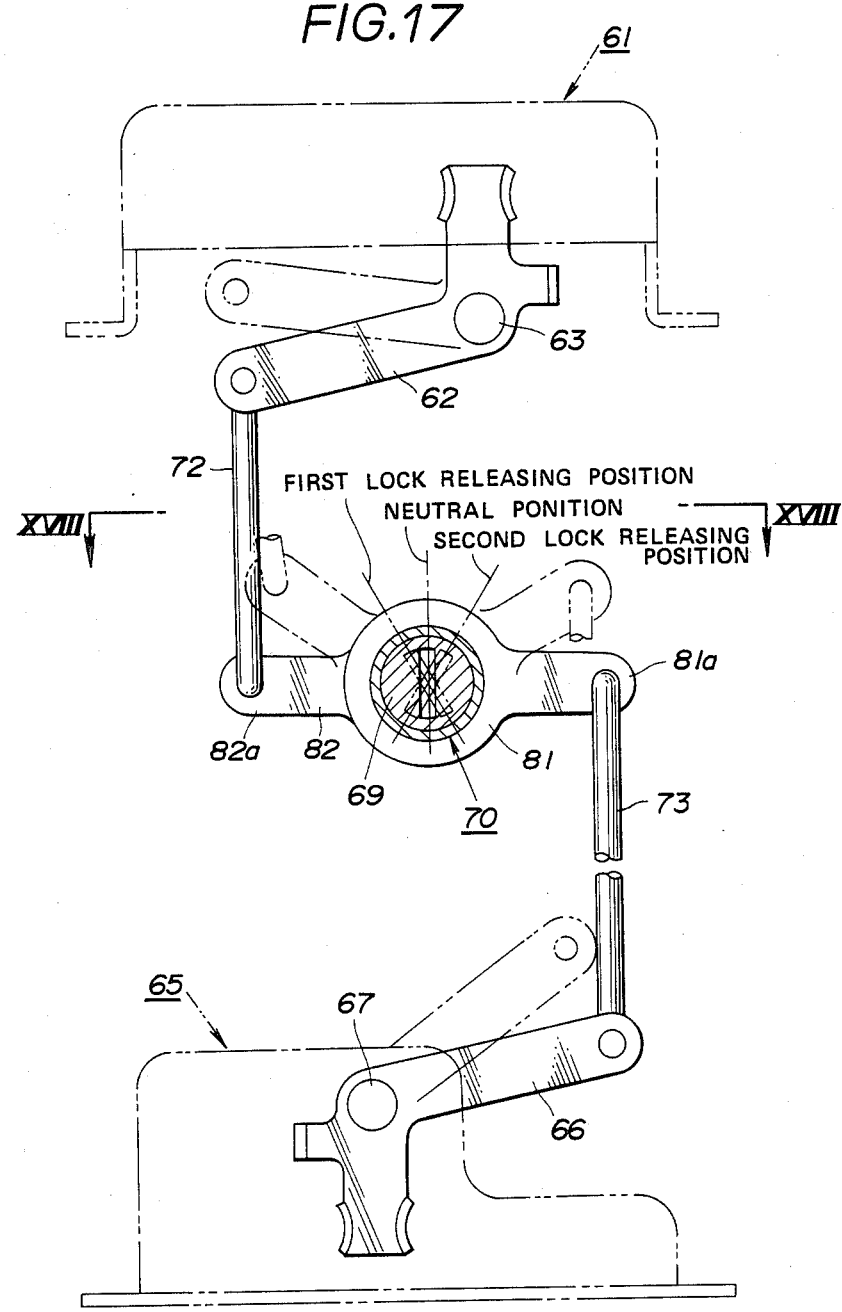
Figure 18:
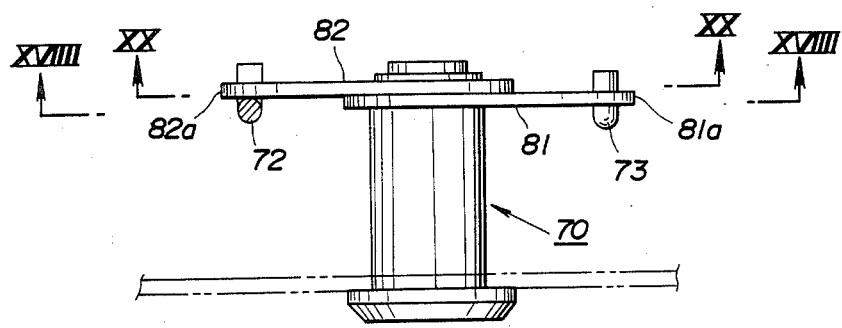

In this third embodiment, in place of the single key plate 71 of the second embodiment, first and second key plates 81 and 82 are employed each having an arm 81a or 82a, as shown in FIG. 17. The first and second key plates 81 and 82 are independently disposed about a key rotor 69 in a manner as will be described hereinbelow.

As is understood from FIG. 17, the arm 81a of the first key plate 81 pivotally holds an upper bent end of the rod 73 extending from the first lock device 65, while, the arm 82a of the second key plate 82 pivotally holds a lower bent end of the other rod 72 extending from the second lock device 61.

Unlike the case of the second embodiment, the lower bent end of the rod 73 is pivotally connected, without lost-motion means, to the pivotal lever 66 of the first lock device 65 and the upper bent end of the rod 72 is pivotally connected, without lost-motion means, to the pivotal lever 62 of the second lock device 61.

Figure 19:
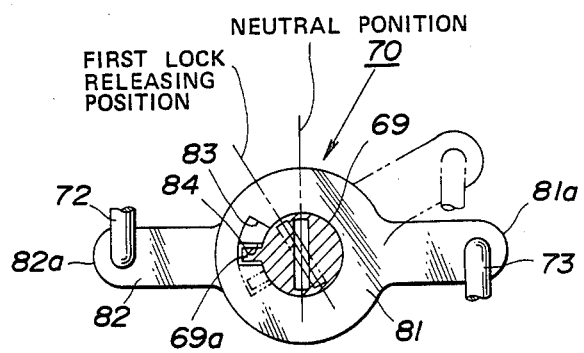
Figure 20:
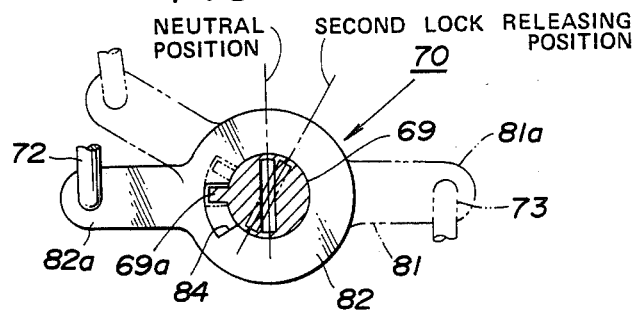
Figure 21:
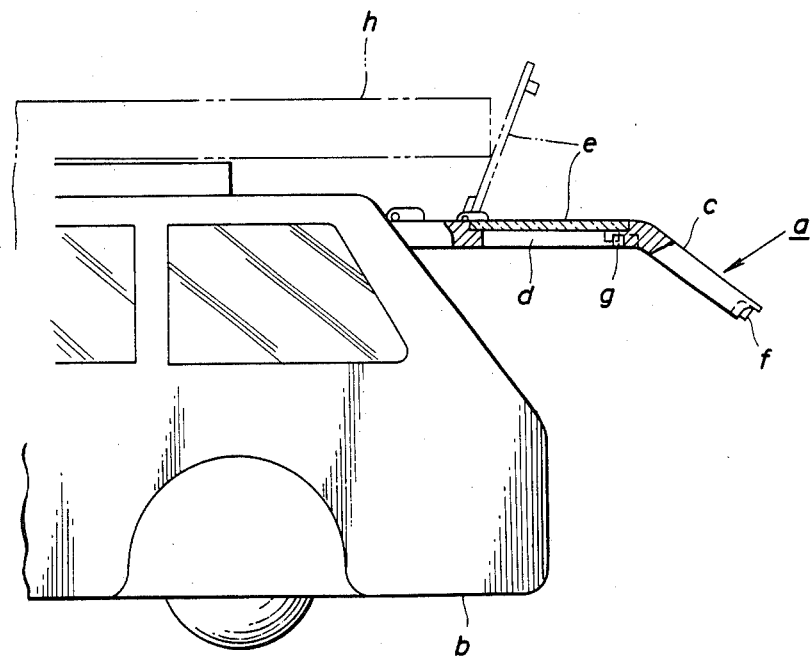
FIG. 21 is a side view of a delivery van type motor vehicle equipped with a conventional lock system for a back door.

As is seen from FIGS. 19 and 20, the first and second key plates 81 and 82 are formed, at portions surrounding the key rotor 69, with respective sectoral recesses 83 and 84. For the reason which will be clarified hereinafter, under a neutral condition of the key rotor 69, the first and second key plates 81 and 82 are arranged to extend in diametrically opposed directions permitting the respective sectoral recesses 83 and 84 to slightly overlap each other. As is seen from FIGS. 19 and 20, under the neutral condition of the key rotor 69, a projection 69a integrally formed on the key rotor 69 is spacedly received in the overlapped portion of the sectoral recesses 83 and 84.

The assembly of this third embodiment is similar to that of the second embodiment, which is as follows:

That is, when the key rotor 69 is turned from the neutral position to the first lock releasing position, the projection 69a of the key rotor 69 is brought into abutment with the lower end of the sectoral recess 83 of the first key plate 81 thereby to turn only the first key plate 81 to the latch releasing position as illustrated by a phantom line in FIG. 19. (During this, the projection 69a of the key rotor 69 makes an idle-movement in the sectoral recess 84 of the second key plate 82 having no effect on the same.) With this movement of the first key plate 81, the pivotal lever 66 (see FIG. 17) is turned to the latch releasing position as illustrated by a phantom line in the drawing. When the key rotor 69 is turned from the neutral position to the second lock releasing position, the projection 69a of the key rotor 69 is brought into abutment with the upper end of the sectoral recess 84 of the second key plate 82 thereby to turn only the second key plate 82 to the latch releasing position as illustrated by a phantom line in FIG. 20. (During this, the projection 69a of the rotor 69 makes an idle-movement in the sectoral recess 83 of the first key plate 81 having no effect on the same.) With this movement of the second key plate 82, the pivotal lever 62 (see FIG. 17) of the second lock device 61 is turned to the latch releasing position as illustrated by a phantom line in the drawing. When the pivotal lever 66 is restrained to the latch releasing position, rotation of the key rotor 69 from the neutral position to the second lock releasing position is blocked, and when the pivotal lever 62 is restrained to the latch releasing position, rotation of the key rotor 69 from the neutral position to the first lock releasing position is blocked.

As operation of the third embodiment is substantially the same as that of the afore-mentioned second embodiment, description of it will be omitted.

In the third embodiment, the first key plate 81, the rod 73 and the pivotal lever 66 of the first lock device 66 constitute a link means for linking the control device 70 to the first lock device 65, while, the second key plate 82, the rod 72 and the pivotal lever 62 of the second lock device 61 constitute a link means for linking the control device 70 to the second lock device 61.

Furthermore, the projection 69a of the key rotor 69 and the sectoral recess 83 of the first key plate 81 constitute a first restraining means, while, the projection 69 of the key rotor 69 and the sectoral recess 84 of the second key plate 82 constitute a second restraining means.

As is understood from the foregoing description, in accordance with the present invention, there is provided an improved lock system for a hinged door of a type having an auxiliary door hinged thereto, in which when one of the main and auxiliary doors is kept closed and latched, opening of the other door is prevented. Thus, the afore-mentioned problem which would arise when the main door (or auxiliary door) is brought into open position with the auxiliary door (or main door)

being opened is overcome. Furthermore, in the present invention, releasing of the two lock devices can be easily and selectively achieved by manipulating only a single control device unlike the case of the afore-mentioned conventional lock system.

What is claimed is:

1. A lock system for a door structure which includes a main door part hinged to a fixed member and an auxiliary door part hinged to said main door part, said lock system comprising:
    a first lock device mounted to said main door part, said first lock device assuming both a latched condition wherein sadi main door part is latched and an unlatched condition wherein said main door part is unlatched;
    a second lock device mounted to said main door part, said second lock device assuming both a latched condition wherein said auxiliary door part is latched and an unlatched condition wherein said auxiliary door part is unlatched;
    a control device mounted to said main door part and linked to said first and second lock devices through respective link means, said control device releasing the latched condition of said first lock device when assuming a first condition, and said control device releasing the latched condition of said second lock device when assuming a second condition;
    restraining means associated with at least one of the link means, said restraining means preventing said control device from assuming a position to allow one of said first and second lock devices to assume its unlatched condition when the other lock device assumes its unlatched condition, wherein said restraining means is arranged to the link means associated with said first lock device, so that when said first lock device is in its unlatched condition, said second lock device is prevented from assuming its unlatched condition wherein said restraining means comprises:
    a first lever pivotal between its latch position taken when said first lock device is in its latched condition and an unlatch position taken when said first lock device is in its unlatched condition;
    a second lever pivotal between first and second angular positions;
    a third lever pivotally arranged to have first, second and third angular positions in this order, said third lever being linked to said control device to be actuated by the same,
    said first, second and third levers being mutually interconnected so that when said first lever is in its latch position and said third lever is in its first angular position, pivoting of said second lever from its first angular position to its second angular position induces a pivoting of said first lever from its latch position to its unlatch position thereby to release the latched condition of said first lock device, and when said first lever is in its latch position and said third lever is in its second angular position, pivoting of said second lever from its first angular position to said second angular position has no effect on said third lever thereby keeping the latched condition of the first lock device, and when said first lever is in its latch position and said third lever is in its third angular position, pivoting of said second lever from its first angular position to its second angular position has no effect on said first lever thereby keeping the latched condition of the first lock device.

2. A lock system as claimed in claim 1, in which said second lever is biased toward its first angular position, and in which said third lever is biased in a direction from its third angular position to tis second angular position.

3. A lock system as claimed in claim 2, in which said first lever comprises:
    a first arm serving as a stopper for stopping a pivoting of said third lever from its second angular position to its third angular position when said first lever assumes its unlatch position,
    a second arm which is pressed by said second lever when said second lever is pivoted from its first angular position to its second angular position and said third lever is in its first angular position, and
    a third arm which is pivotally connected to said first lock device so as to transmit the pivotal movement of said first lever to said first lock device.

4. A lock system as claimed in claim 3, in which said first and second levers are pivotal about a common pivot axis, and in which said third lever is pivotal about a pivot axis which is parallel with but spaced from said common axis.

5. A lock system as claimed in claim 4, in which said second lever is formed with a generally T-shaped slot through which a slide pin extending from said third lever is slidably passed.

6. A lock system as claimed in claim 5, in which said slide pin is slidably engaged with an arcuate slot formed in said third lever, said arcuate slot being concentric with said common pivot axis when said third lever assumes its first angular position.

7. A lock system as claimed in claim 6, in which said T-shaped slot comprises a first arcuate section, a sectoral section and a second arcuate section which are merged in a manner to form the generally T-shaped slot, said first arcuate section and said sectoral section have a common arcuate edge which is concentric with said pivot axis of said third lever when said second lever assumes its first angular position, said second arcuate section extending from a junction portion of said first and sectoral sections, said second arcuate section being concentric with the pivot axis of said common pivot axis.

8. A lock system as claimed in claim 7, in which said slide pin has at its one end spaced collars between which the peripheral edge of the arcuate slot of said third lever is slidably received.

9. A lock system as claimed in claim 8, in which said slide pin is biased by a spring in a direction to abut against one extreme end of the arcuate slot of the third lever.

10. A lock system as claimed in claim 9, in which said spring has a raised portion by which a detent feeling is produced when said slide pin rides over the same.

11. A lock system as claimed in claim 10, in which said second lever is biased by a coil spring to assume its first angular position.

12. A lock system as claimed in claim 10, in which said first arm of said first lever is exposed to said sectoral section of the T-shaped slot of said second lever when said first lever assumes its unlatch position and said second lever assumes its first angular position.

13. A lock system as claimed in claim 11, in which an leading end the second arm of said first lever becomes flush with the common arcuate edge of said first arcuate section of the T-shaped slot of the second lever when said first lever assumes its latch position and said second lever assumes its first angular position.

14. A lock system as claimed in claim 12, in which said third lever has biasing means which biases said third lever in a direction from its third angular position to its second angular position.

15. A lock system for a door structure which includes a main door part hinged to a fixed member and an auxiliary door part hinged to said main door part, said lock system comprising:
  a first lock device mounted to said main door part, said first lock device assuming both a latched condition wherein said main door part is latched and an unlatched condition wherein said main door part is unlatched;
  a second lock device mounted to said main door part, said second lock device assuming both a latched condition wherein said auxiliary door part is latched and an unlatched condition wherein said auxiliary door part is unlatched;
  a control device mounted to said main door part and linked to said first and second lock devices through respective link means, said control device releasing the latched condition of said first lock device when assuming a first condition, and said control device releasing the latched condition of said second lock device when assuming a second condition;
  restraining means associated with at least one of the link means, said restraining means preventing said control device from assuming a position to allow one of said first and second lock devices to assume its unlatched condition when the other lock device assumes its unlatched condition, wherein said restraining means comprises first and second restraining means which are arranged to the respective link means associated with said first and second lock devices, said first restraining means preventing said second lock device from assuming its unlatched condition when said first lock device is in its unlatched condition, said second restraining means preventing said first lock device from assuming its unlatched condition when said second lock device is in its unlatched condition wherein said restraining means comprises:
  first and second pivotal levers respectively connected to said first and second lock devices; and
  first and second lost-motion means which are respectively interposed between said first pivotal lever and said control device and between said second pivotal lever and said control device.

16. A lock system as claimed in claim 4, in which said control device comprises a pivotal key plate having radially outwardly extending opposed two arms which are respectively linked to said first and second pivotal levers through said first and second most-motion means.

17. A lock system as claimed in claim 5, in which each of said first and second lost-motion means comprises a bent end of a rod extending from each of said two arms, and an arcuate slot formed in the leading end of each of said first and second pivotal levers, said bent end of the rod being slidably engaged with said arcuate slot.

18. A lock system as claimed in claim 16, in which said pivotal key plate is secured to a key rotor of a key cylinder which is a part of said control device.

19. A lock system as claimed in claim 14, in which said control device comprises first and second pivotal key plates which are respectively and pivotally connected to said first and second pivotal levers through rods, said first and second pivotal plates being disposed on a common key rotor in such a manner that a pivotal rotation of one of said first and second key plates does not induce a rotation of the rotation of the other key plate.

20. A lock system as claimed in claim 18, in which each of said first and second key plates has a circular opening through which said key rotor is rotatably received, and in which each of said first and second key plates has a sectoral recess merged with the corresponding circular opening, said first and second key plates being disposed about said key rotor with their sectoral recesses partially overlapped to provide an overlapped space into which a projection formed on said key rotor is spacedly projected.

* * * * *